UNITED STATES PATENT OFFICE.

ALFRED N. ATWOOD, OF PHILADELPHIA, PENNSYLVANIA.

IMPROVEMENT IN COMPOSITIONS FOR BURIAL-CASKETS.

Specification forming part of Letters Patent No. 136,404, dated March 4, 1873.

*To all whom it may concern:*

Be it known that I, ALFRED N. ATWOOD, of the city of Philadelphia, in the State of Pennsylvania, have invented a certain Incorruptible and Impervious Compound to be used in the Manufacture of Burial-Caskets, of which the following is a specification:

My composition consists of the following ingredients, in about the proportions named: Asbestus and asphaltum in about equal proportion, and brimstone about one-twentieth of the two combined. The greater portion of the asbestus is used in a pulverized state. The asphaltum is subjected to the action of heat until it is thoroughly melted. Then the asbestus and the brimstone are stirred in and thoroughly incorporated with it. The compound, while in a hot state, is poured into suitable molds for forming the caskets, which are strong, tough, and impervious to water and air, and susceptible of the finest polish.

The brimstone might be dispensed with, yet it is preferable to use it, as it increases the hardness of the compound, and makes it susceptible of a finer polish than it possesses without it.

Besides using the compound for the construction of the bodies of the caskets, I also use it for saturating paper for lining them, after thinning it with turpentine, with or without coal-tar, so that it may be readily absorbed by the paper.

I claim as my invention—

A compound composed of asphaltum and asbestus, with or without the use of brimstone, substantially in the proportions and for the purpose set forth.

ALFRED N. ATWOOD.

Witnesses:
 STEPHEN USTICK,
 THOMAS J. BEWLEY.